(12) United States Patent
Campbell

(10) Patent No.: US 8,677,877 B2
(45) Date of Patent: Mar. 25, 2014

(54) TRAVELING WAVE AUGMENTED RAILGUN

(76) Inventor: Robert Neil Campbell, Corrales, NM (US)

(*) Notice: Subject to any disclaimer, the term of this patent is extended or adjusted under 35 U.S.C. 154(b) by 183 days.

(21) Appl. No.: 13/135,688

(22) Filed: Jul. 13, 2011

(65) Prior Publication Data
US 2013/0015295 A1    Jan. 17, 2013

(51) Int. Cl.
*F41B 6/00* (2006.01)
(52) U.S. Cl.
USPC ............................................. 89/8
(58) Field of Classification Search
USPC ............................................. 89/8
See application file for complete search history.

(56) References Cited

U.S. PATENT DOCUMENTS

| | | | | |
|---|---|---|---|---|
| 2,235,201 A * | 3/1941 | Cole | ............... | 124/3 |
| 4,922,800 A * | 5/1990 | Hoffman | ............... | 89/8 |
| 4,945,810 A * | 8/1990 | Parker | ............... | 89/8 |
| 5,237,904 A * | 8/1993 | Kuhlmann-Wilsdorf | ............... | 89/8 |
| 7,730,821 B2 | 6/2010 | Taylor | | |
| 2006/0027084 A1* | 2/2006 | Schneider | ............... | 89/8 |

* cited by examiner

*Primary Examiner* — Stephen M Johnson

(57) ABSTRACT

A railgun launcher with principle rail energization and fielding derived from a co-traveling energy pulse associated with a close-coupled parallel transmission line structure. Enhanced system efficiency, plus amelioration of simple railgun negative features, is enabled via the induction hybrid railgun methodology proposed.

20 Claims, 2 Drawing Sheets

TRAVELING WAVE AUGMENTED RAILGUN

BACKGROUND OF INVENTION

1. Field of Invention

The present invention relates to the field of electrically energized rail launchers, more specifically, an electromagnetic launcher/induction hybrid railgun with principle rail energization and fielding derived from a co-traveling energy pulse associated with a close-coupled parallel transmission line structure.

2. Description of Prior Art

There is an extensive history in regards these devices. At a very basic level, they are a linear electrical motor. Two conductors with an armature, free to move, providing the conduction connection between the rails. The approach is typically alternatively identified as a railgun or electromagnetic launcher. In order to drive an object of any reasonable mass to some useful velocity, typically very high currents in the multi mega-amp (MA) range are required in such a device. This requirement has specific practical problems that are inextricably associated with it and, to enumerate a few, consider the following.

Even though the rails may be of a very conductive material, short of superconducting, they will present with linearly increasing resistance as armature progresses along the rail. A net rail resistance of milli-Ohms (mΩ) would present a directly attributable voltage drop of approximately kilo-Volts for 1 MA and an associated, purely loss related power dissipation of ~1 GW (Giga-Watt) or more.

If the rails were superconducting, the preceding would be avoidable, but there would be technical issues in regards preventing solid ice accumulation on rail surfaces. Aside from the running surface difficulty presented by on rail ice, moisture accretion within a high voltage environment is less than desirable. Short of effective sustained dry gas purging or in vacuum applications, this would be unavoidable.

Regardless of whether or not rails are superconducting or not, high current transfer from one rail, through armature to the other rail is invariably associated with some form of arcing behavior, either locally at the rail armature interface or across the entire rear surface of the armature (so called hybrid and plasma armatures). This results in rail erosion much as a welding arc would. In military applications, rail lifetime, as in the sense of conventional artillery barrel lifetimes, would not be a significant issue, as such systems are not subject to the sustained use expected of cost effective civilian systems.

Radiation from intense arcing can produce plasma ahead of the armature, which becomes a self limiting problem in that induced plasma serves to oppose armature acceleration as it represents a local, higher density gas component. Gas is of course associated with aerodynamic drag. This is sometimes called ablation resistance.

Radiation from intense arcing and typically associated with plasma formation can produce/induce secondary plasma emission at some other location on the rail; this can close as a switch (commutate) resulting in a secondary arc and power leakage.

An alternate type of armature is the liquid metal armature. This is an additional complication and has the potential to 'freeze' metal onto the rail with each event, thus affecting subsequent launch attempts.

In the simple, basic level, two rail configuration plus armature, given that the full drive current is channeled through the two parallel rails for the length of the barrel (acceleration region), it is then a basic fact that, as armature moves from the entrance to the end of rail, the circuital self-inductance increases commensurately, which complicates the issue of efficient power delivery to the armature. The simple railgun of this consideration is also, by convention, un-augmented. The entrance to the rail is equivalently the armature entry point to railgun acceleration region. The end of the rail is equivalently the armature exit point from railgun acceleration region. These armature entry and exit locations to a railgun acceleration region also correspond to rail element entry and end points. By common convention they may also be viewed as breech and muzzle locations.

U.S. Pat. No. 7,730,821 (Electromagnetic launcher with augmented breech) describes an electromagnetic launcher wherein a housing with breech and muzzle is slidably supported in a carriage supported on a trunnion. The first and second contacts are electrically connectable to receive electrical power from an electrical power supply. First and second augmentation conductors are disposed aft of the trunnion and are electrically connected to the first and second electrical contacts. First and second main conductors extend from the breech towards the muzzle. A current cross over connection is disposed towards the breech and electrically connects the first and second augmentation conductors with the first and second main conductors, respectively. The first and second electrical contacts and the first and second augmentation conductors may be engaged in slidable electrical contact over a portion of the first and second augmentation conductors, thereby accommodating recoil motion.

The primary deficiencies in regards conventional augmentation schemes are, correctly, in part, identified in the background of this patent, namely, significantly enhanced system inductance with associated motional back electromotive force (emf), which can be prohibitive for large aperture, hypervelocity systems. There are also the issues of energy storage in the augmenting system, losses and energy recovery at the very least.

The deficiencies of restricting oneself to the preceding general approach are well documented. As indicated, performance/efficiency and lifetime issues would be critical to any meaningful civilian application as distinct from military use.

An alternative with some merit, albeit less than ideal approach in some respects, is to be found in the so called STAR and UTSTAR railgun approach [The STAR Railgun Concept. I. R. McNab. IEEE Transactions on Magnetics. 35(1), 1999, 432-436]. A novel concept for a staged augmented railgun is evaluated in which an external field would be applied to the bore of the railgun in addition to the self induced magnetic field resulting from current flow in the main rails. The augmenting field would be provided by multiple saddle shaped coils, located on the exterior of the gun barrel. These electrical discharge energized magnetic coils, which would operate at high magnetic field strengths, would be transiently powered so that their magnetic field would only be present in the vicinity of the projectile. The magnetic field is alternatively defined to be the B field. The energy contained in the coils would be transferred forward to successive coils as the projectile travels down the barrel. In principle then energy losses would be minimized compared with other barrel concepts. However a more detailed evaluation of this concept shows that very high voltages could be needed to power the coils, so the concept may be unattractive for short barrels and high velocity applications.

There are a number of deficiencies apparent with this approach. Firstly, each coil has to be turned on rapidly, which has switching, timing and voltage implications for each coil assembly. This as alluded to in the statement that, high velocities may be unattractive with this concept. In addition, turning off the preceding coil precisely in sync with the coil turned on is just as significant an issue if one wishes to avoid any growth in system back electromotive force (by convention, emf) or odd induced transients courtesy of flux accretion in the volume defined by a common rail segment and armature. Indeed, since there is no explicit or even implicit reference to such a fundamental mitigating interaction, or its implications in the article, it is clear that the consequences of such behavior was not contemplated. The invention presented here naturally accomplishes this in a rail segment without any requirement for switching of an associated series array, in propagation direction, of individual coils.

The article, Launch to Space with an Electromagnetic Railgun [I. R. McNab. IEEE Transactions on Magnetics. 39(1), 2003, 295-304] describes many advances in electromagnetic (EM) railgun and power supply technology that had been made in recent years. Laboratory experiments with railguns have demonstrated muzzle velocities of 2-3 km/s and muzzle energies >8MJ. The extension of this technology to the muzzle velocities (>7500 m/s) and energies (>10GJ) needed for direct launch of payloads into orbit is very challenging, but may not be impossible. For launch to orbit, even long launchers (>1000 m) would need to operate at accelerations of >1000 gees to reach the required velocities, so that it would only be possible to launch rugged payloads, such as fuel, water and material. A railgun system concept is described here and technology development issues are identified. Estimated launch costs could be attractively low (<$600/kg) compared with the space shuttle (>$20000/kg), provided that acceptable launch rates could be achieved. Further evaluations are needed to establish the technical and economic feasibility with confidence.

This approach as articulated utilizes independent coil(s) transiently energized only when the projectile is nearby. Again, since there is no reference to induction behavior courtesy of synced coil switching on and off within a common rail element it is apparent that such a fundamental interaction/behavior was not contemplated here.

In addition and in support thereof, in terms of the description and graphics provided, it would appear to be the case that the UTSTAR and thus STAR modules are in fact indeed separate elements, each module with a separate current feed and an individual augmentation coil powered from power supplies positioned with each module as per the distributed energy store railgun with rail segments concept. This is probably only sensible if each module's rail elements are isolated from neighboring module rail elements, otherwise all neighboring rail elements would require rapid and significant opening switch capability on their own associated discharge power systems [illustrated in the previously cited I. R. McNab. IEEE Transactions on Magnetics. 35(1), 1999, page 434, FIG. 5]. Isolated module rail elements would naturally provide such. In other words, the system is in fact a series array of simple augmented railguns, in which case the local module is subject to the back emf problems associated with the local externally applied/augmented field armature interaction, as the turn off of the preceding module element's augmenting fields does not counterpoint the turn on of the augmenting fields in any other separate module. In effect, the flux linkage growth attributable to armature motion through impressed magnetic field is not counterpointed within any module.

As an indication that this interpretation is correct it should be noted that the author of the above two cited cases did not identify the fundamental fact that the appropriately synchronized and mutually matched turning on of an augmentation field, or flux linkage growth through armature motion in externally applied augmenting field, in conjunction with the turning off of the preceding augmentation field within a common rail, i.e. common circuit, element would in fact provide for matching forward emf with backward emf within this configuration and thus, essentially an induction drive/power transfer from the coils to the rail.

Further support for this understanding is to be found in the paper, Progress on Hypervelocity Railgun Research for Launch to Space by I. R. McNab, presented at the Electromagnetic Launch Technology, 2008 14th Symposium, in which research on critical issues for launch to space from a railgun carried on an airborne platform is considered; this includes techniques with the goal of achieving hypervelocity of ~7 km/s: so far, 5.2 km/s has been achieved in a 7 m augmented railgun using a pre-injected plasma armature. Further study is being carried out on distributed power feed concepts that will improve the efficiency of launch for a long railgun: so far, 11 km/s has been achieved with a plasma arc in a five-stage system. Aerothermal behavior of a 10 kg projectile for flight from high-altitude launch into orbit is being investigated: so far, the results show that an acceptable amount (~15 mm) of nose tip ablation will occur.

The configuration presented is possessed of a unitary augmenting field structure for the given rail element. It is further apparent that within this technical approach, the externally applied magnetic field will in general not be optimal within the duration of the armature acceleration event. This is deficient relative to the invention presented here whereby, when appropriately configured, the co-traveling magnetic field pulse experiences only limited diminution during armature acceleration per rail segment. It is similarly deficient in that the back emf in this case would be approximately 300 to 400 and more percent greater than presented by this invention whereby only the rail discharge self-back emf applies, free of augmenting field contribution. The latter may not be significant for small bore, moderate velocity systems, but will be significant to prohibitive at larger bore and higher velocities and thus presents a scalability issue.

The author also did not provide any explanation of how to transfer the coil energy to successive coils along the barrel in a manner matching projectile motion.

Finally, if the objective was to accelerate a projectile to +20 km/s the switching and timing requirements and the associated voltages and currents of a sequenced individual coil series array would become severe. This is no different to the problem presented by the coil switching issue in pure induction accelerators such as coil guns, where the voltage required increases with velocity and thus high voltage commutation of multiple coils in axial series represents the technological limit to achievable launch velocity.

SUMMARY OF INVENTION

The invention is comprised of a transmission line structure of inductive and capacitive elements [FIG. 3] external to but in close proximity to the associated railgun drive rails [FIG. 2]. By adjustment of these local capacitive and inductive elements, the line phase velocity of a transmission line associated pulse or traveling wave structure is defined external to the said railgun drive rails, which provides for a continuously co-traveling with between drive rail armature, as such phase matched, induced and impressed magnetic field structure. Phase matching within the context of this discussion relates to the co propagation of the optimal location of a pulse or traveling wave structure, carried by a transmission line, with the time dependent location of an armature/projectile traveling between the drive rails of the associated close coupled rail element. Since the acceleration behavior of the armature/projectile within this structure is predictable and repeatable for a common projectile of specified mass and other relevant physical features, inclusive of repeatable railgun energization parameters, achievement of said phase matching is viable.

Each such assembly, plus matched power supplies and switching assemblies, is considered to be a rail segment.

The associated drive rail structure, of a specific rail segment, is considered to be a rail element.

The forgoing eliminates the requirement of having to switch multiple individual coils sequentially along a given rail element. For each rail segment there are only two switching events associated with entry of armature to rail. Transmission line structure is switched such that the centroid of the induced co-traveling magnetic B field matches armature location on its entry to rail element concerned. Once armature has progressed sufficiently into the rail element, such that decaying spatial edge of co-traveling spatially limited B field structure is adequately opposing the back emf attributable to armature forward motion and its B field interaction, then rail element discharge current itself is turned on [FIG. 1, A].

This behavior provides for the majority drive power transfer to the armature, with the direct rail power supply providing for the working current. Thus an induction hybrid railgun in principle.

The increment in armature energy is also required to be only a limited fraction of the initial transmission line energy so as to ensure only a limited perturbation of transmission line co-traveling pulse in and during rail segment interaction event.

Since the impressed magnetic field B is substantial (30 to 40 Tesla or greater) the rail element working current required is significantly smaller than would be required in a simple two rail configuration relying only on its self-magnetic field derived from its own working current. This in turn implies that any coupling influence of the rail element working current on the close-coupled transmission line will represent no more than a small perturbation on its behavior.

The system would be designed for a common projectile of specified mass and other relevant features as in-rail element projectile acceleration is required to conform to the design matched phase velocity change of said rail element's corresponding external transmission line structure, which is predetermined by transmission line design. The common projectile would in principle be a carrier vehicle or aero-shell for whatever product is required to be accelerated to very high velocity, perhaps even to earth escape velocity or greater.

As the traveling wave or pulse carrier structures, that is, the external transmission line(s), are in fact isolatable from the rail elements themselves. They would be ideally cooled to temperatures at which they are superconducting. In addition, organic liquids with both low melting points (approximately 100K) and which are significantly polar, may be used to construct superconducting transient use high storage, compact capacitors. This would translate to multi-mega Amp current, low loss capable transmission lines as required for high B field generation.

At a fundamental level, as the armature progresses in a rail segment in a phase matched manner with the associated transmission line carried spatially localized pulse or traveling wave structure and its related magnetic B field, then the following basic interactions apply [FIG. 2, A, B]. The armature motion into the externally impressed B field induces a back emf as it increments the attributable flux linkage of the rail drive circuit. As a result of the progression of the spatially localized pulse or traveling wave structure along the rail element's associated transmission line, in concert with armature motion, the related B field is turned off at a similar rate to rear of armature. Thus the net change in principle drive circuit flux linkage attributable to the influence of the associated transmission line is near zero. The principle drive circuit is that associated with the rail element of a given rail segment. Therefore, by Faraday's law, there is no net induced emf in the principle rail drive circuit, which is to say that the motional attributable back emf deriving from the armature is counterpointed by the turn off rate of the externally impressed B field intersecting rail circuit as result of said B field pulse (spatially localized) progression with armature.

This is important as alternatively, in the absence of the turn off rate forward emf compensation particular to this augmentation approach, the associated rail element power supply would have to operate at voltages in excess of the attributable armature motion interaction induced back emf, which could rapidly become challenging to prohibitive for large bore, truly hypervelocity devices.

It is also evident then, as a result of the induced forward emf, that there is power transfer from the co-traveling field to the rail drive circuit itself, this power transfer increasing with magnitude of imposed B field and armature velocity.

As a prerequisite for this methodology to function, the spatial extent of the co-traveling B field pulse must be significantly shorter than the length of the related rail segment wherein it is applied. Ideally, it is also required to be reasonably closely phase/motionally matched with armature, which implies a varying transmission line phase velocity to match armature acceleration within any rail segment.

In reality in a rail segment, that is rail element plus associated transmission line, at higher entrance velocities, this required phase velocity change becomes relatively small as, for a given energy input to the armature, the induced velocity increment delivered is approximately inversely proportional to the armature rail segment entrance velocity. That is, induced armature velocity change is small, and thus required co-traveling B field velocity change is small.

BRIEF DESCRIPTION OF DRAWINGS

The accompanying drawings, which are incorporated into and form a part of the disclosure, illustrates embodiments of the invention, and together with the description serve to explain the principles of the invention.

DETAILED DESCRIPTION OF INVENTION

The best mode contemplated by the inventor of the rail gun with principle rail energization and fielding derived from a co-traveling energy pulse is comprised of at the basic system unit level, of a rail element plus associated transmission line structure and related power supplies and switching assemblies. That is a rail segment.

The global system is typically made up of a sequenced series of rail segments. The number of rail segments in a sequence is determined by requirements such as deliverable exit velocity, tolerable acceleration, aero-shell design mass and related aperture requirement and costing.

Figure 3:
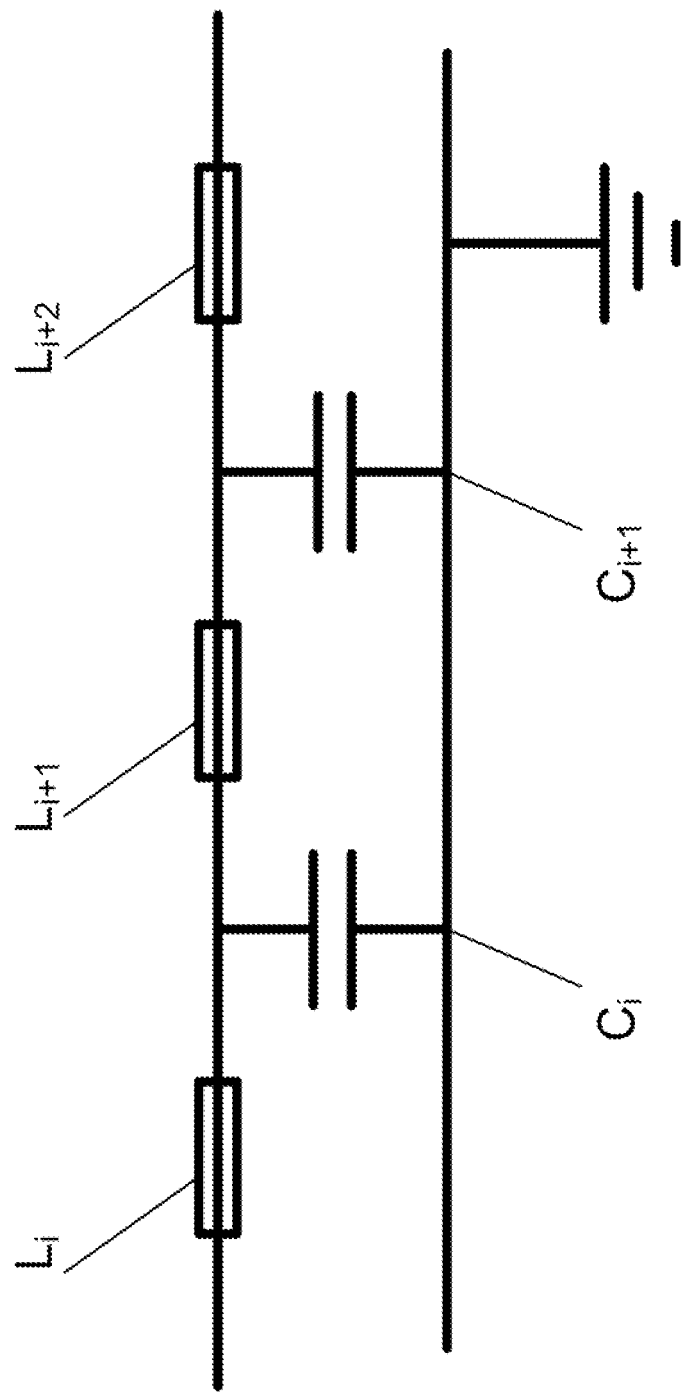
FIG. 3: Basic transmission line structure. $L^{i*}$, $C_i^*$ are the local inductance and capacitance per unit length. Thus if transmission line is made up of discrete elements then local elemental inductance and capacitance are represented by $C_i=C_i^*Le_i$ and $L_i=L_i^*Le_i$, with $Le_i$, a local discrete length selected to provide practical values, but considerably shorter than related rail element length.

Each rail segment is comprised of a rail element plus matched power supply. Close-coupled to rail element of rail segment is a transmission line structure designed to provide for a spatially limited, relative to rail element length, co-traveling with armature current, and thus magnetic field, pulse [FIG. 1, A, B, C, D, E]. This is accomplished by appropriate design manipulation of transmission line inductance and capacitance per unit length [FIG. 3].

Figure 1:
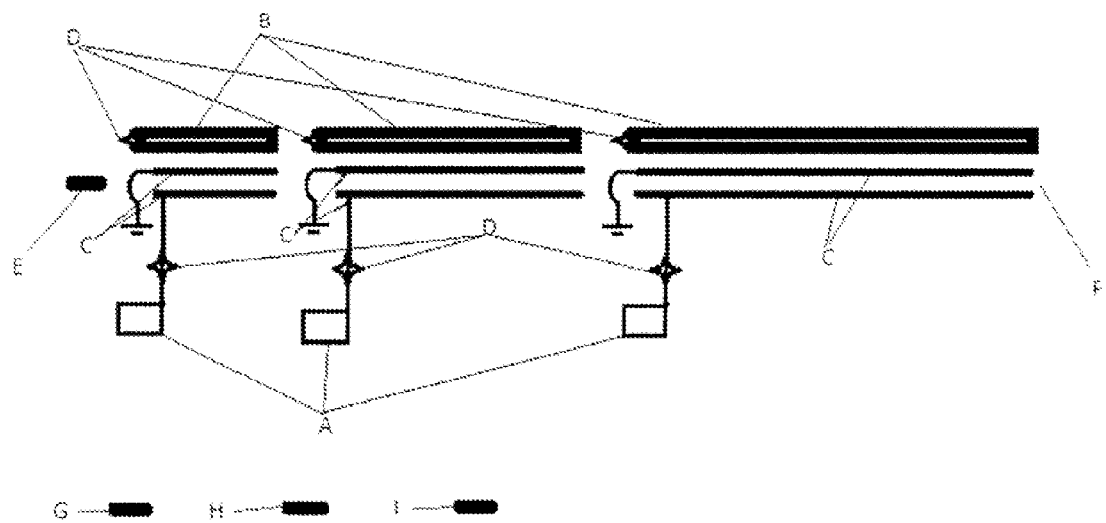
FIG. 1: Each rail element is associated with an external transmission line structure serving as carrier for a pulse or traveling wave element which is a source of a spatially localized high B field. Individually designed rail segments are assembled in series to provide for maintenance of optimal matching of pulse or traveling wave phase velocity and projectile velocity. [A]—Primary power supplies for rail elements, each individually matched to associated rail element's specific requirements. [B]—External transmission line structures, each individually matched to associated rail element's specific requirements within the series array of rail segments constituting overall railgun. [C]—Rail elements themselves. [D]—Switching elements of rail element and transmission line structure. Within the confines of this document the terms switch, switching element and switching assemblies refer to the same entity singularly or in multiplicity as is made clear by the context. [E]—Armature/projectile. The projectile is an aeroshell structure with a payload compartment for any material of interest.
Figure 2:
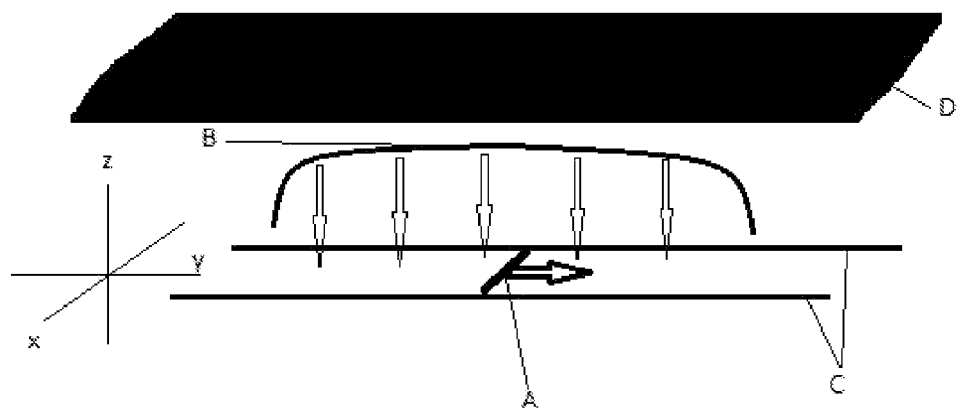
FIG. 2: Basic concept of a rail segment. Rail segment equals rail element plus associated external transmission line structure. [A]—Armature in motion. [B]—Motionally matched, with armature, spatially limited externally impressed magnetic field attributable to and associated with, current pulse propagating in transmission line. [C]—A section of rail element of rail segment under consideration. [D]—The corresponding section of transmission line structure responsible for induced magnetic field, which is impressed on rail element.

Transmission line segment(s) ideally superconducting [FIG. 1, B]. Close-coupled denotes that transmission line is in sufficient proximity and appropriately orientated, or perhaps even such that rail element is imbedded internal to it, such that the rail plus armature structure is optimally orientated and located to interact with said transmission line structure's induced, insignificantly, courtesy of proximity, spatial falloff degraded B field.

The majority of energy storage is in the transmission line structures, and should be of such scale as to render that transferred to armature drive and thus motion no more than a small percentage and thus perturbing influence on transmission line pulse behavior. This is accomplished by appropriate design of transmission line elements [FIG. 3]. In regards recovery of the residual energy in a transmission line after the armature has departed its related rail element, it would be adequate to mirror the transmission line structure into a reduced phase velocity component and, with suitable opening switches, isolate residual energy pulse. This can be accomplished at constant line impedance, eliminating back reflection issues or, for varying line impedance provided impedance is varied to an appropriate law. This residual energy would then be available for utilization in another launch event.

Each rail segment possesses two necessary switching elements. Firstly, that of the close coupled to rail element associated transmission line structure. Given that currents in the transmission line structure would be in the high to multi mega Amp regime; low inductance rail gaps, switched by USP (ultra short pulse) lasers via REMPI (resonance enhanced multi-photon ionization) induced creation of highly conducting extended plasma channels is a feasible option. These could be opened, switched off, by gas blowing the gaps or utilizing intense magnetic field shearing of the discharge should such be required. The rail element plus attached power supply discharge would be at currents significantly below those in the transmission line and thus hard coupled parallel solid state switching is feasible [FIG. 1, A, C]. Secondly, the other switching structure would be associated with rail element power supply.

In function, then for each rail segment there are only two critical switching events associated with entry of armature into rail. Firstly the transmission line structure is switched such that the centroid of the induced co-traveling B field matches armature location on its entry to rail element concerned. Secondly once the armature has progressed sufficiently into rail element such that the decaying spatial edge of the co-traveling spatially limited B field structure's related induced forward emf is adequately opposing the back emf attributable to armature forward motion and its B field interaction, then rail element discharge current itself is turned on [FIG. 1, A].

This sequence is repeated on entry of armature to each sequential rail segment of rail gun system concerned.

For optimal performance the system would be operated at altitude, or with efficient gas clearing systems permitting sub atmosphere to near vacuum in barrel/rail element conditions. The forgoing could be assisted by the automated emplacement and replacement of light frangible structures as gas seals at rail element entrance and exit locations. Alternatively, high speed electro mechanical shutters could be employed.

The armature/projectile is, by the nature of this device, required to be a predefined carrier aeroshell, to be loaded with any desired suitable material or launch aids to its specification overall mass. This to ensure projectile motional phase matching with co-traveling, augmenting, induction field.

A system of sufficient synchronized stages or rail segments, in series, may be utilized for a 'green' (non exhaust product if associated with say hydropower or tidal power generation source for example) electromagnetic, induction hybrid, railgun for low earth orbit insertion purposes, or attainment of earth escape velocity for material ejection purposes. Earth escape velocity legitimately corresponds to attainment of hypervelocity for macroscopic objects. System electrical efficiency, plus fact that it is not system aperture or final muzzle velocity limited to the extent of standard augmented railgun/electromagnetic launch systems and that it is repetition ratable lends itself to in time heavy lift capacity, or heavy earth escape ejection capacity, or utilization as a high mass flow high specific impulse space thrust system or as a strategic defense system capable of a high rate of fire of hittiles (terminally guided kinetic kill projectiles) against orbital or fractional orbital systems.

The spatially limited transmission line carried traveling wave or pulse interaction generates opposing forward and backward emf's within an associated rail element, thus the back emf experienced by the related rail element power supply is that attributable largely and only to its own simple rail/armature interaction and is limited and thus not prohibitive in the case of large bore hypervelocity devices. This aspect renders this augmented approach scalable.

The forgoing description of the invention has been presented for purposes of illustration and description and is not intended to be exhaustive or to limit the invention to the precise form disclosed. Modifications and variations are possible in the light of the above teaching. The embodiments disclosed were meant only to explain the principles of the invention and its practical application to thereby enable others skilled in the art to best use the invention in various embodiments and with various modifications suited to the particular use contemplated.

What is claimed is:

1. An external transmission line carried traveling wave or pulse augmented railgun comprising at least at a basic system unit level a power supply plus associated rail element and related switch, switched external close-coupled transmission line structure configured such that a launched current pulse event, and thus associated B field, will phase match the motion of the accelerating armature while maintaining a current pulse spatial extent significantly smaller than rail element length, a switching element admitting appropriate synchronization between transmission line event and rail element discharge.

2. An external transmission line carried traveling wave or pulse augmented railgun, according to claim 1, wherein the rail element plus close-coupled transmission line arrangement is such that the induced transmission line B field pulse optimally, or at least adequately, intersects the rail plus armature structure in a progressive phase matched manner in time, and admits amongst other configuration possibilities the imbedding of the rail element within the associated transmission line structure.

3. An external transmission line carried traveling wave or pulse augmented railgun, according to claim 1, wherein the armature, and thus projectile or armature plus projectile, thereof is a predefined aero-shell with carrier capability to be loaded with any desired and suitable material to its specification overall mass, for acceleration and thus transportation as required.

4. An external transmission line carried traveling wave or pulse augmented railgun, according to claim 1, wherein the external close-coupled transmission line structure is superconducting.

5. An external transmission line carried traveling wave or pulse augmented railgun, according to claim 1, wherein basic system units may be sequenced in series to access a variety of muzzle or projectile exit velocities.

6. An external transmission line carried traveling wave or pulse augmented railgun, according to claim 1, wherein the majority of armature drive power is derived from the external traveling wave or pulse interaction with the associated rail element and armature, and thus from transmission line structure.

7. An external transmission line carried traveling wave or pulse augmented railgun, according to claim 1, wherein as the majority of armature drive power is derived from external traveling wave or pulse, and thus from transmission line structure, the transmission line structure must be such that the related energy storage significantly exceeds that of the energy increment of the armature (projectile) in related rail segment event.

8. An external transmission line carried traveling wave or pulse augmented railgun, according to claim 1, wherein as the majority of armature drive power is derived from the close-coupled external transmission line traveling wave or pulse, the linear increment in the rail element self inductance and thus attributable back emf experienced by said rail element with armature motion is less significant than would be the case given a static externally imposed augmentation B field or an enhanced B field generated by a multi turn rail.

9. An external transmission line carried traveling wave or pulse augmented railgun, according to claim 1, wherein as the traveling wave interaction generates opposing forward and backward emf's within an associated rail element, the back emf experienced by the related rail element power supply is that attributable largely and only to its own simple rail/armature interaction and is limited and thus not prohibitive in the case of large bore hypervelocity devices.

10. An external transmission line carried traveling wave or pulse augmented railgun, according to claim 1, wherein as the spatially limited traveling wave or pulse interaction generates opposing forward and backward emf's within a rail element, the back emf experienced by the related rail element power supply is that attributable largely and only to the self simple rail/armature interaction, absent contributions from augmenting field, and is limited, as is thus the related rail element power supply voltage required to drive any desired rail current.

11. An external transmission line carried traveling wave or pulse augmented railgun, according to claim 1, wherein per unit element only limited switching is required as externally impressed field's propagation is determined by transmission line design, which is so configured as to coincide with predetermined armature motion within associated rail element as subject to specified critical system conditions, said conditions being applied voltages, aero-shell characteristics or entrance velocity at least.

12. An external transmission line carried traveling wave or pulse augmented railgun, according to claim 1, wherein the rail element discharge is at currents to significantly minimize rail erosion.

13. An external transmission line carried traveling wave or pulsed augmented railgun, according to claim 1, wherein as current in a rail element is well below that of an un augmented railgun for comparable function; arcing is limited as is ablation resistance, admitting access to a notably higher range of projectile, and thus armature, velocities.

14. An external transmission line carried traveling wave or pulse augmented railgun, according to claim 1, wherein since the majority of armature drive power is derived from the close-coupled transmission line, which is ideally super conducting, then for required rail element currents the system losses are minimized and efficiency as expressed by the ratio of armature motional energy to electrical energy transferred to armature drive is maximized.

15. An external transmission line carried traveling wave or pulsed augmented railgun, according to claim 1, wherein the residual transmission line structure energy post armature departure from the associated rail element end point, may be recovered by mirroring transmission line structure inclusive of a reduced phase velocity element, where with suitable opening switches this energy can be trapped and recovered for utilization in a following event.

16. An external transmission line carried traveling wave or pulse augmented railgun, according to claim 1, wherein according to achievable performance characteristics it has the potential to function as a earth surface based micro satellite earth orbital insertion system.

17. An external transmission line carried traveling wave or pulse augmented railgun, according to claim 1, wherein according to achievable performance characteristics it has the potential to function as a earth surface based earth orbital insertion system for obscurants to mitigate the transmitted solar constant, that is for a possible global warming moderator.

18. An external transmission line carried traveling wave or pulse augmented railgun, according to claim 1, wherein according to achievable performance characteristics it has the potential to function as an earth surface based earth escape to space projectile insertion system.

19. An external transmission line carried traveling wave or pulse augmented railgun, according to claim 1, wherein according to achievable performance characteristics it has the potential to function as an earth surface based earth to space projectile drive system, and thus to serve as an ejection system of depleted nuclear fuel or of other dangerous waste into solar impacting orbits for example.

20. An external transmission line carried traveling wave or pulse augmented railgun, according to claim 1, wherein according to achievable performance characteristics it has the potential to function as a repetition rated, earth surface based, earth escape velocity or earth orbit insertion system of considerable monthly and yearly lift capacity, as an electrically efficient high mass flow, high specific impulse, space based thrust system or a surface based launcher for terminally guided kinetic kill projectiles.

* * * * *